(12) United States Patent
Glasco et al.

(10) Patent No.: US 7,769,979 B1
(45) Date of Patent: Aug. 3, 2010

(54) CACHING OF PAGE ACCESS PARAMETERS

(75) Inventors: David B. Glasco, Austin, TX (US);
Lingfeng Yuan, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 698 days.

(21) Appl. No.: 11/523,925

(22) Filed: Sep. 19, 2006

(51) Int. Cl.
*G06F 12/00* (2006.01)
(52) U.S. Cl. .................. 711/203; 711/118; 711/144; 711/156
(58) Field of Classification Search .......... 711/203, 711/118, 144, 156
See application file for complete search history.

(56) References Cited

U.S. PATENT DOCUMENTS

| | | | |
|---|---|---|---|
| 7,107,411 B2 * | 9/2006 | Burton et al. ............ | 711/147 |
| 2004/0268071 A1 * | 12/2004 | Khan et al. ............. | 711/163 |
| 2006/0004984 A1 * | 1/2006 | Morris et al. ........... | 711/203 |
| 2006/0230223 A1 * | 10/2006 | Kruger et al. ........... | 711/6 |
| 2006/0259825 A1 * | 11/2006 | Cruickshank et al. ..... | 714/38 |
| 2007/0106874 A1 * | 5/2007 | Pan et al. .............. | 711/206 |
| 2007/0168643 A1 * | 7/2007 | Hummel et al. .......... | 711/207 |

\* cited by examiner

*Primary Examiner*—Stephen C Elmore

(57) ABSTRACT

A technique for caching page access parameters, in accordance with one embodiment of the present invention, includes translating a given virtual address to a particular physical address using an address translation data structure. One or more page access parameters related to the particular physical address is stored in a separate page access data structure. The technique may further include accessing the page access data structure to manage access to memory as a function of the page access data.

20 Claims, 8 Drawing Sheets

CACHING OF PAGE ACCESS PARAMETERS

BACKGROUND OF THE INVENTION

Instructions and data used by a computing device are stored at physical addresses in one or more primary or secondary memory devices. A primary memory device, such as system memory, graphics memory and the like, is characterized by quick access times but store a limited amount of data. Secondary memory devices, such a magnetic disk drives, optical disk drives and the like, can store large amounts of data, but have a relatively longer access time as compared to the primary memory devices.

Generally, instructions and data are stored in pages in the one or more secondary memory devices. As pages are needed by a given application, they can be moved into one or more primary memory devices. Pages that are no longer needed by the application can be moved from the primary memory device back to the secondary memory device to make room for another page that is needed by a given application. When pages are moved from secondary to primary memory or moved from primary memory back to secondary memory, their physical addresses change. However, it is undesirable and inefficient for applications running on a computing device to keep track of these changing physical addresses.

Accordingly, the applications utilize virtual addressing to access instructions and data. Virtual addressing provides a separation between the physical memory and the addresses that an application accesses to load or store data and instructions. Processes running inside a virtual memory space do not have to move data between physical memory devices, and do not have to allocate or reallocate portion of the fixed amount of system level memory between them. Instead, a memory management unit (MMU) and/or the operating system (OS) keeps track of the physical location of each piece of data, and moves data between physical locations to improve performance and/or ensure reliability.

Referring to FIG. 1, an exemplary address translation data structure utilized to translate virtual addresses 110 to physical addresses 120 is illustrated. The address translation data structure may include a page table data structure 130 and a translation lookaside buffer (TLB) 140. The page table data structure 130 may include a page directory 150 and one or more page tables 160-190. The page directory 150 includes a plurality of page directory entries (PDE). Each PDE includes the address of a corresponding page table 160-190. Each PDE may also include one or more parameters. Each page table 160-190 includes one or more page table entries (PTE). Each PTE includes a corresponding physical address of data and/or instructions in primary or secondary memory. Each PTE may also include one or more parameters.

Upon receiving a virtual address, the TLB 140 is accessed to determine if a mapping between the virtual address 110 and the physical address 120 has been cached. If a valid mapping has been cached (e.g., TLB hit), the physical address 120 is output from the TLB 140. If a valid mapping is not cached in the TLB, the page table data structure is walked to translate the virtual address 110 to a physical address 120. More specifically, the virtual address 110 may include a page director index, a page table index, and a byte index. The page directory index in the virtual address 110 is used to index the page directory 150 to obtain the address of an appropriate page table 170. The page table index in the virtual address 110 is used to index the appropriate page table specified in the given PDE to obtain the physical address 120 of the page containing the data. The byte index in the virtual address 110 is then used to index the physical page to access the actual data. The resulting mapping is then typically cached in the TLB 140 for use in translating subsequent memory access requests. Furthermore, as a page moves from secondary memory to primary memory or from primary memory back to secondary memory, the corresponding PTE in the page table data structure 130 and TLB 140 is updated.

Generally, the PTEs and/or PDEs can also store additional parameters associated with memory accesses, referred herein to as attributes. An exemplary PTE that stores page parameters is shown in FIG. 2. The PTE includes a page frame address 120 and one or more bits for storing attributes 220. The attributes 220 may include a dirty bit, an accessed bit 230, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like. The attributes 220 can be used by the MMU and/or OS to manage the data in the primary and secondary memories and access thereto.

For example, the accessed bit 230 may be used by the OS to calculate a page usage bit that indicates how often in a given period, the corresponding page was accessed. The calculated page usage parameter may in turn be used by the OS in conjunction with a replacement algorithm to determine which pages can be evicted from the primary memory to make room for other pages to be loaded from the secondary memory.

SUMMARY OF THE INVENTION

Embodiments of the present invention are directed toward techniques for caching attributes associated with virtual address to physical address translations. In one embodiment, a computing device includes a processor, memory and a memory management unit. The memory includes a page table data structure and a separate page access data structure. The memory management unit is adapted to store a page access parameter in the separate page access data structure.

In another embodiment, a method of caching page access parameters includes translating a given virtual address to a particular physical address and storing a page access parameter related to the particular physical address in a page access data structure that is separate from the data structure utilized for translation.

In yet another embodiment, a method of caching page access parameters includes accessing one or more page access data structures, wherein the page access data structures store one or more attributes such as an accessed bit or referenced bit. The cached page access parameter may then be used to manage memory.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
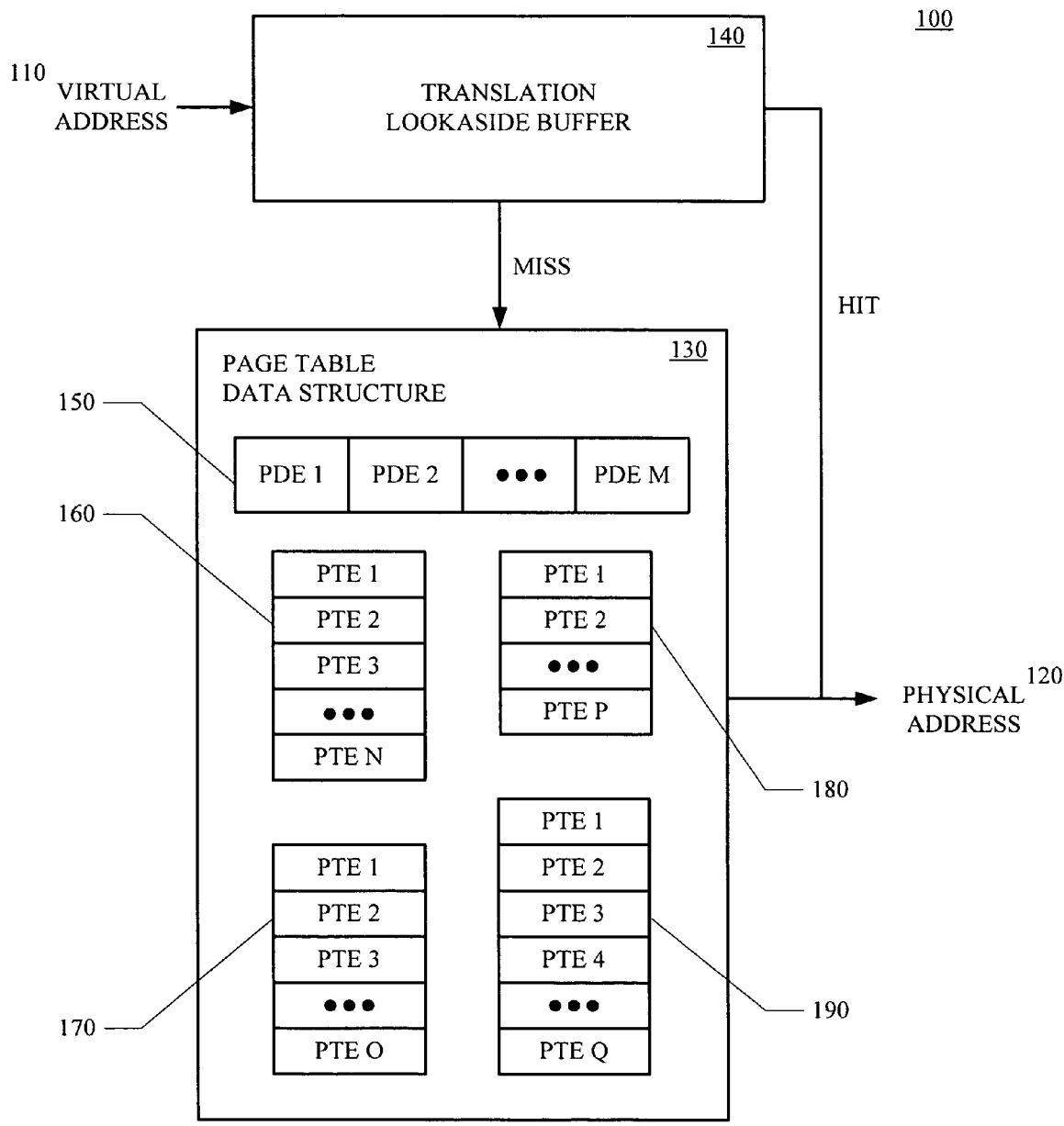
FIG. 1 shows a block diagram of an exemplary page translation data structure according to the conventional art.
Figure 2:
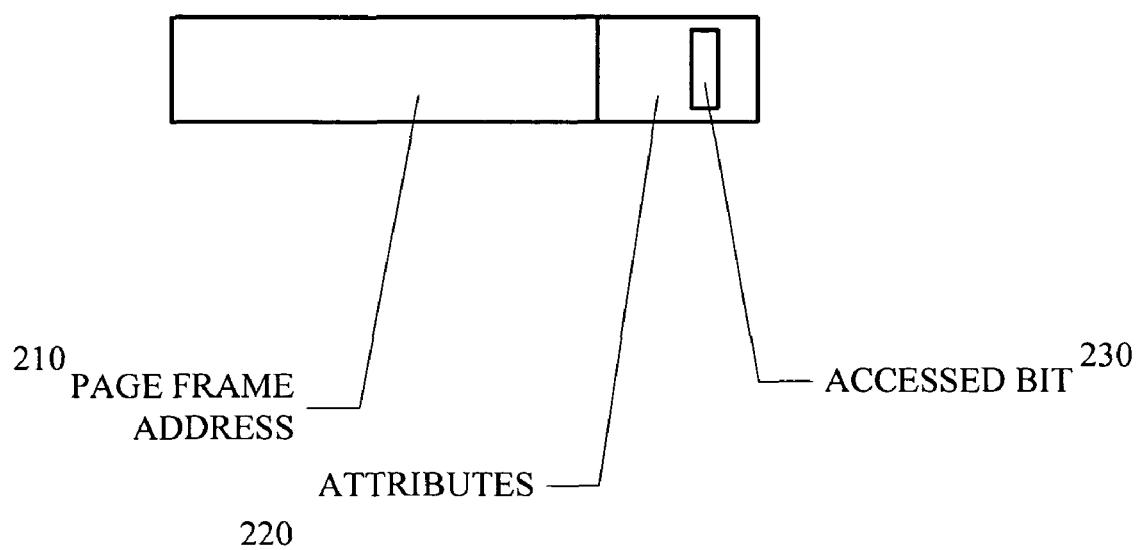
FIG. 2 shows a block diagram of an exemplary PTE that stores attributes according to the conventional art.
Figure 3:
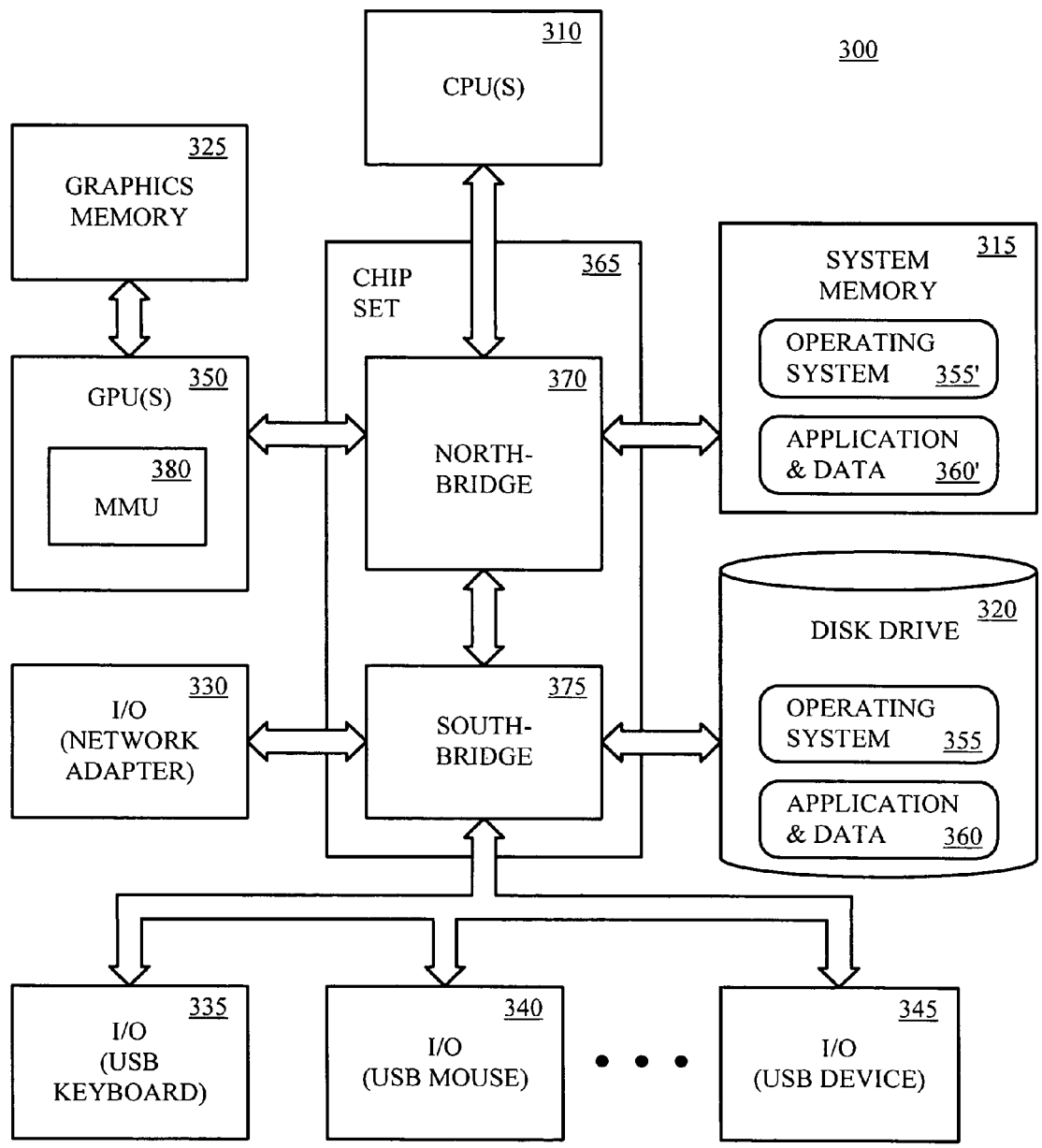
FIG. 3 shows a block diagram of an exemplary computing device for implementing embodiments of the present invention.

Referring to FIG. 3, an exemplary computing device 300 for implementing embodiments of the present invention is shown. The computing device 300 may be a personal computer, server computer, client computer, laptop computer, hand-held device, minicomputer, mainframe computer, distributed computer system or the like. The computing device 300 includes one or more processors (e.g., CPU) 310, one or more computing device-readable media 315, 320, 325 and one or more input/output (I/O) devices 320, 330, 335, 340, 345. The I/O device 330, 325, 340, 345 may include a network adapter (e.g., Ethernet card), CD drive, DVD drive and/or the like, and peripherals such as a keyboard, a pointing device, a speaker, a printer, and/or the like. The computing device 300 may also include one or more specialized processors, such as a graphics processing unit (GPU) 350.

The computing device-readable media 315, 320, 325 may be characterized as primary memory and secondary memory. Generally, the secondary memory, such as a magnetic and/or optical storage, provides for non-volatile storage of computer-readable instructions and data for use by the computing device 300. For instance, the disk drive 320 may store the operating system (OS) 355 and applications and data 360. The primary memory, such as the system memory 315 and/or graphics memory 325, provides for volatile storage of computer-readable instructions and data for use by the computing device 300. For instance, the system memory 315 may temporarily store a portion of the operating system 355' and a portion of one or more applications and associated data 360' that are currently used by the CPU 210, GPU 350 and the like.

The computing device-readable media 315, 320, 325, I/O devices 320, 330, 335, 340, 345, and GPU 350 may be communicatively coupled to the processor 310 by a chip set 365 and one or more busses. The chipset 365 acts as a simple input/output hub for communicating data and instructions between the processor 310 and the computing device-readable media 315, 320, 325, I/O devices 320, 330, 335, 340, 345, and GPU 350. In one implementation, the chipset 365 includes a northbridge 370 and southbridge 375.

The graphics processing unit 350 may include a memory management unit (MMU) 380 for managing the transfer of data and instructions. However, in other embodiments the MMU 380 may be independent circuit, a part of the chip set 365, a part of the primary or secondary memory, or other component in the computing device.

The MMU 380 translates virtual address to physical addresses. In one implementation, the virtual address space is divided into pages of size $2^N$ bytes. The pages may be from 2 kilobytes to 512 megabytes or more, and are typically 4 kilobytes to 64 kilobytes in size. In such cases, the MMU 380 translates virtual page numbers to physical page numbers utilizing an address translation data structure.

The MMU 380 and/or OS 355 also implements cache control. In particular, if no memory location is free it may be necessary to choose an existing page, using any well-known in the art replacement algorithm, and save it to non-system memory (e.g., a mass storage device such as a disk). The MMU 380 and/or OS 355 controls swapping pages between primary and secondary memory and updating the associated mappings in the address translation data structure.

Figure 4:
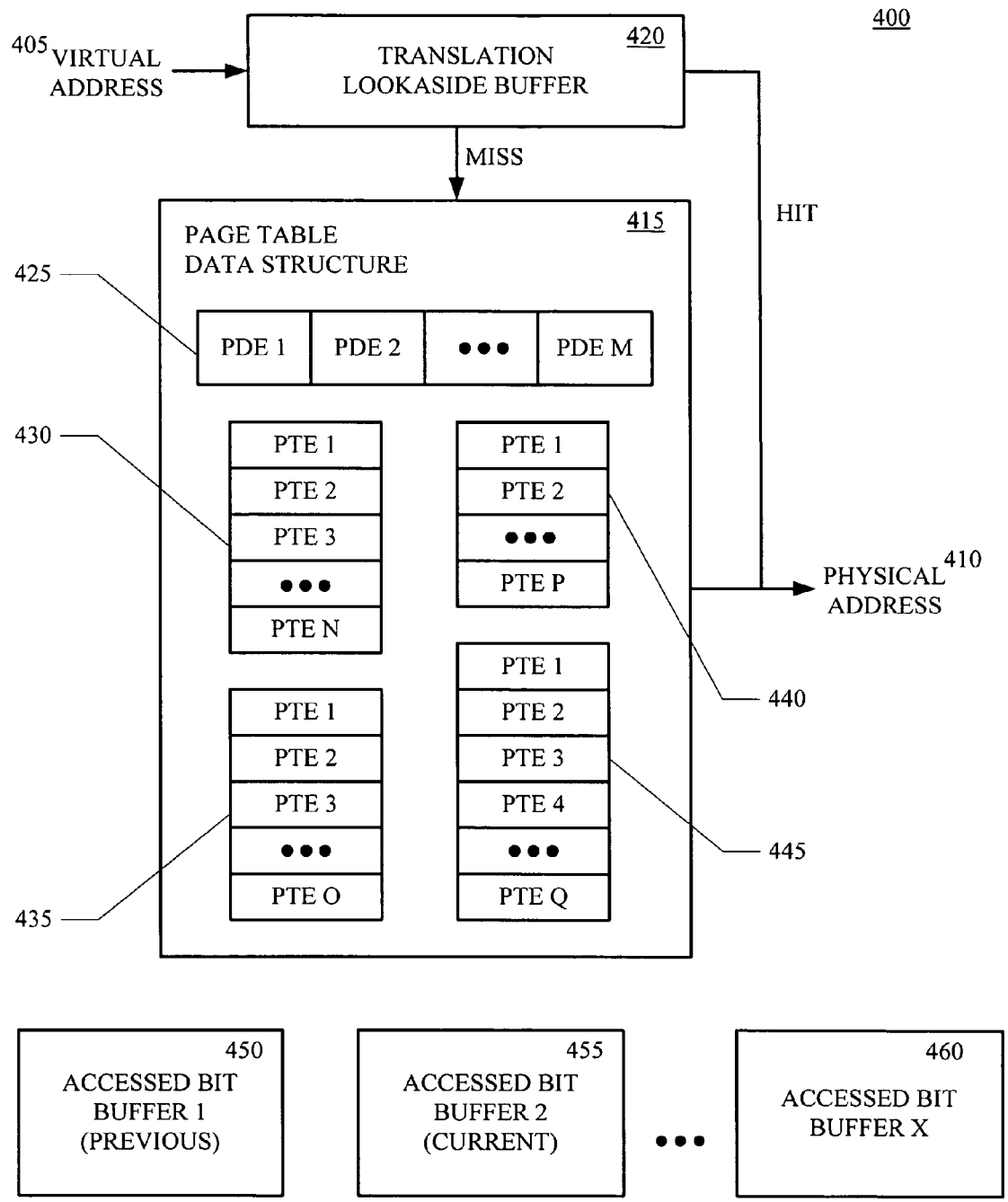
FIG. 4 shows a block diagram of an address translation data structure, in accordance with one embodiment of the present invention.

Referring now to FIG. 4, an address translation data structure 400 utilized to convert virtual addresses to physical addresses, in accordance with one embodiment of the present invention, is shown. The address translation data structure 400 may include a page table data structure 415, a translation lookaside buffer (TLB) 420 and one or more page access data structure. The page table data structure 420 may be a two-level data structure including a page directory 425 and one or more page table 430-445. However, the page table data structure 420 may be arranged in any number of levels.

The page directory 425 includes a plurality of page directory entries (PDE). Each PDE includes the address of a corresponding page table 430-445. Each PDE may include one or more attributes for use in performing the translation and accessing the physical memory. Each page table 430-445 includes one or more page table entries (PTE). Each PTE includes a corresponding physical address of data and/or instruction in primary or secondary memory. The PTE also includes one or more attributes for use in performing the translation and accessing the physical memory. The attributes, stored in the PTE and/or PDE, may include a dirty bit, a page check disable bit, a page write transparent bit, a user accessible bit, a writeable bit, a present bit, a hash function identification bit, a valid bit, an address compare bit, a changed bit, storage control bits, a no execute bit, page protection bits and/or the like. However, attributes related to page usage may be stored in the one or more page access data structures 450-460 separate from the PTEs and/or PDEs in the TLB 420 and page table data structure 415. For example, an accessed bit, a referenced bit or the like, hereinafter referred to as a page access parameter, may be stored in the one or more page access data structures 450-460. The page access data structures 450-460 may be arranged as a linear vector, an array, banked array or similar type of buffer.

The page access parameter may be set by the MMU 380 when the corresponding page is accessed. In particular, when the a given page is written to and/or read from, the MMU 380 sets the corresponding page access bit in the one or more page access data structures 450-460.

The page access parameter may advantageously be densely packed and managed separately from the page table data structure 415 and TLB 420. The page access data structures 440-450 may be generated by the MMU 380, the OS 355' or the like. The MMU 380 and/or OS 355' may store the page access data structures 440-450 in one or more computing device-readable media, such as the system memory 315, graphics memory 325, on chip (e.g., CPU, GPU, MMU) or the like. Herein after the term "store" with reference to page access parameter includes storing, setting, updating and clearing.

The page access data structures 440-450 may be translated back to the virtual memory space for use by the CPU 310, MMU 380 or the like. Furthermore, it is appreciated that page access parameters for pages that are stored in secondary memory are not needed. Thus, only page access parameters of pages residing in primary memory may be stored.

Each page access data structure may be generated for a particular period. In one implementation, current accessed bits are stored in a first buffer 450 and previous accessed bits are stored in a second buffer 455. After a given period, current accessed bits are stored in the second buffer 445 and the first buffer 440 then contains the new set of previous accessed bit. In another implementation, accessed bits are stored in a corresponding one of X data structures (e.g., 10 buffers) for each of X periods. After each of the X data structures are filled for the first X periods the X data structures are re-used to store the respective next set of accessed bits for the next X periods.

In one implementation, each period may be a specified amount of time (e.g., a specified number of clock cycles). In another implementation, each period may be bounded by the occurrence of an event, such as the next TLB miss, the next page fault or the like. The OS 355' may control which buffer in primary memory the current accessed bit is stored in, and in which the usage bit for each of the previous periods is stored in by passing a pointer of the appropriate buffer to the MMU 380, or vice versa.

In addition, the OS 355' or MMU 380 may control whether the page usage parameters are stored or not. In one implementation, an indicator, such as a flag, set to a first state may cause the MMU 380 to update the current page access parameters in a page access data structure 440-450. If the flag set to a second state, the MMU 380 may stop storing page access parameters in the page access data structure 440-450.

Figure 5:
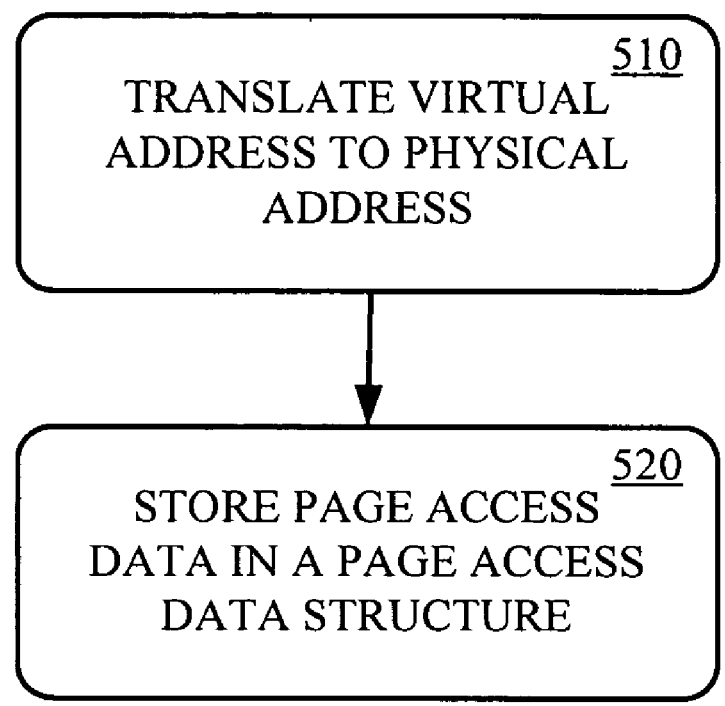
FIG. 5 shows a flow diagram of a method of page access parameter caching, in accordance with one embodiment of the present invention.

Referring to FIG. 5, a method of page access parameter caching, in accordance with one embodiment of the present invention, is shown. As depicted in FIG. 5, the method includes translating a given virtual address to a particular physical address, at 510. At 520, page access data related to the particular physical address is stored in a page access data structure.

Figure 6:
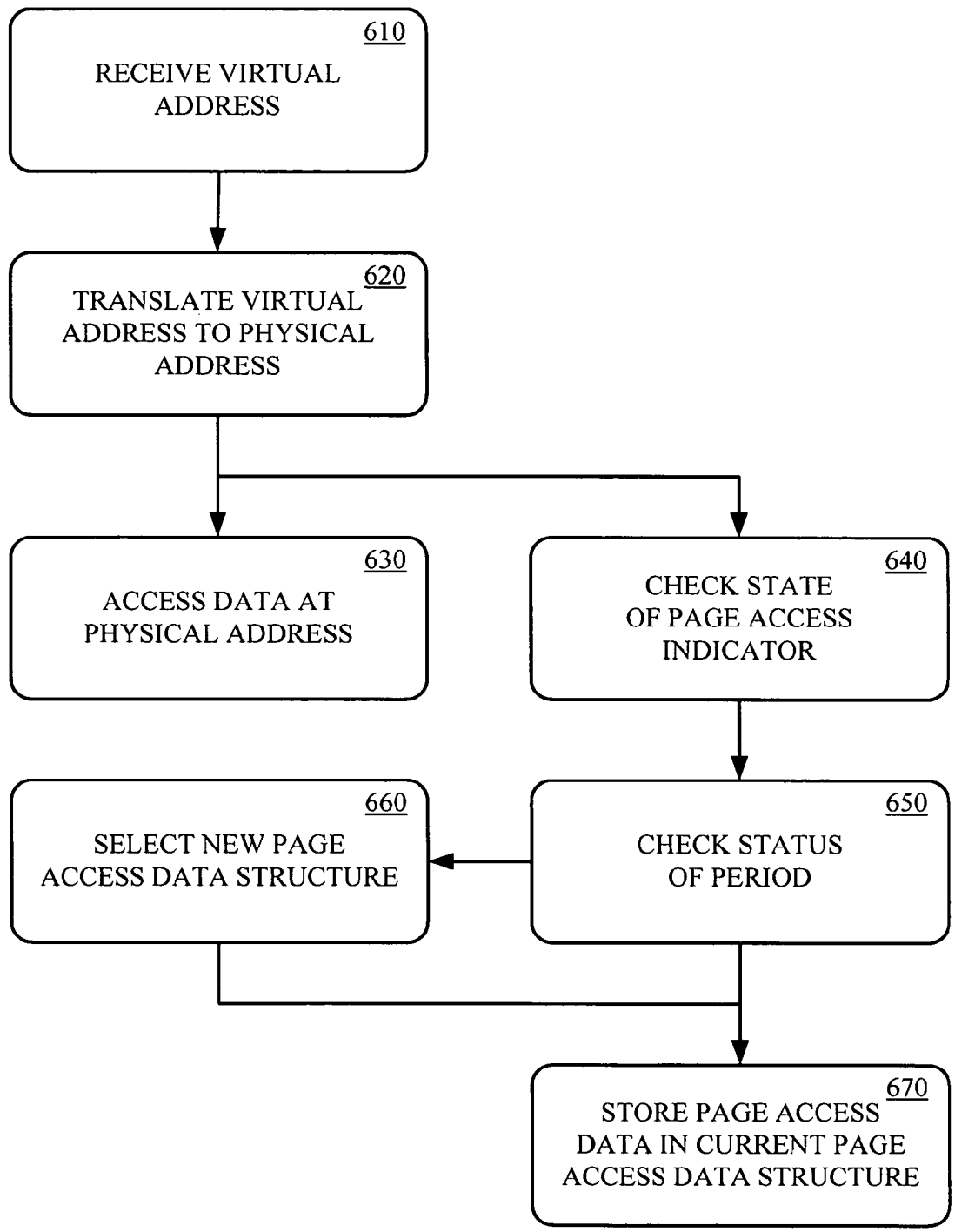
FIG. 6 shows a flow diagram of an exemplary method of updating page access parameters, in accordance with one embodiment of the present invention.

One exemplary method of updating page access parameters is illustrated in FIG. 6. The method includes receiving a virtual address, at 610. At 620, the virtual address is translated to a physical address. At 630, the data and/or instructions at the physical address is accessed.

At 640, a state of a page access update indicator, such as a flag, may be checked. However, it is to be appreciated that the page access update indicator and checking it is an optional process in embodiments of the present invention. If the page access update indicator is set to a first state, the accessed bit in the page access data structure is updated. If the page access update indicator is set to a second state, updating of the page access parameter corresponding to the physical address is skipped.

At 650, the status of a period may be checked. In one implementation, each period may be a specified amount of time (e.g., clock cycles). In another implementation, each period may be bounded by the occurrence of an event (e.g., the next TLB miss). At the end of the period, a new page access data structure is selected as the current data structure, at 660. In one implementation, the new page access data structure is selected from one of a plurality of data structures that is not the current data structure. At 670, the accessed bit, corresponding to the physical address, in the current data structure is stored, if the state of the page access parameter flag is set to the second state. In one implementation, the state of each data accessed bit in a new data structure is set to a first state (e.g., cleared) at the time the new data structure is designated as the current data structure. When the page is accessed the corresponding accessed bit is stored by setting the state of the bit in the current data structure to a second state (e.g., updated). Furthermore, the page access parameter corresponding to the physical address may be updated prior to, substantially contemporaneously with, or after the virtual address is translated to the physical address. In addition, the page access parameter may be a "sticky bit" in that it is set when the page is accessed for the first time. If the page is accessed again, the bit does not need to be set again.

It is to be appreciated that checking the status of the period and selecting a new page access data structure after the period has ended is an optional process in embodiments of the present invention. Furthermore, the optional process of checking the page access update indicator may be combined with checking the status of the period and creating a new page access data structure according may be combined as illustrated in FIG. 6.

In one embodiment, the method is associated with each translation of a virtual address to a physical address. However, in another embodiment the method of updating page access parameters is associated with translations of virtual addresses to physical addresses for read operations. In another embodiment, the method is associated with translations of virtual addresses to physical addresses for write operations. In yet another embodiment, the access bit can be set when the fill unit fetches the PTE.

Figure 7:
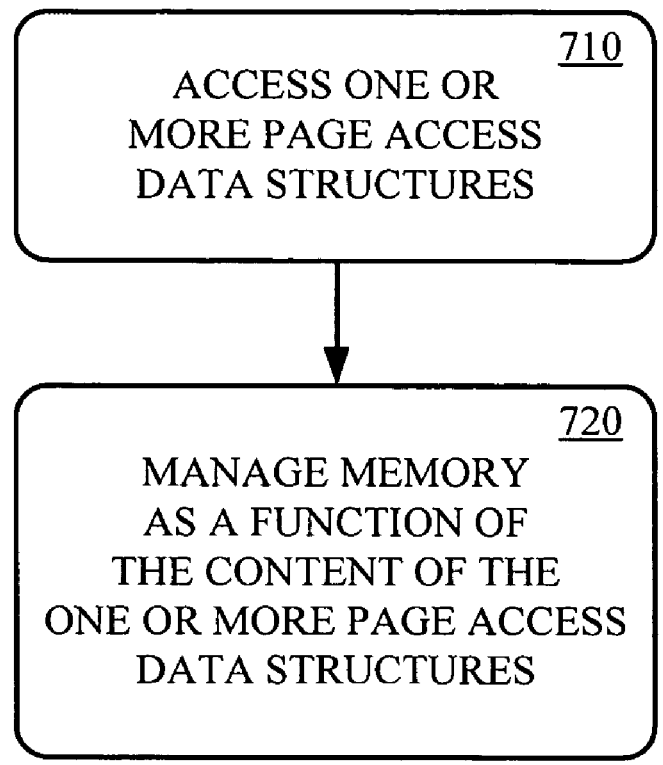
FIG. 7 shows a flow diagram of a method of page access parameter caching, in accordance with one embodiment of the present invention.

Referring to FIG. 7, a method of page access parameter caching, in accordance with one embodiment of the present invention, is shown. The method includes accessing one or more page access data structures, at 710. The page access data stored in the one or more page access data structures may be utilized to manage memory, at 720.

Figure 8:
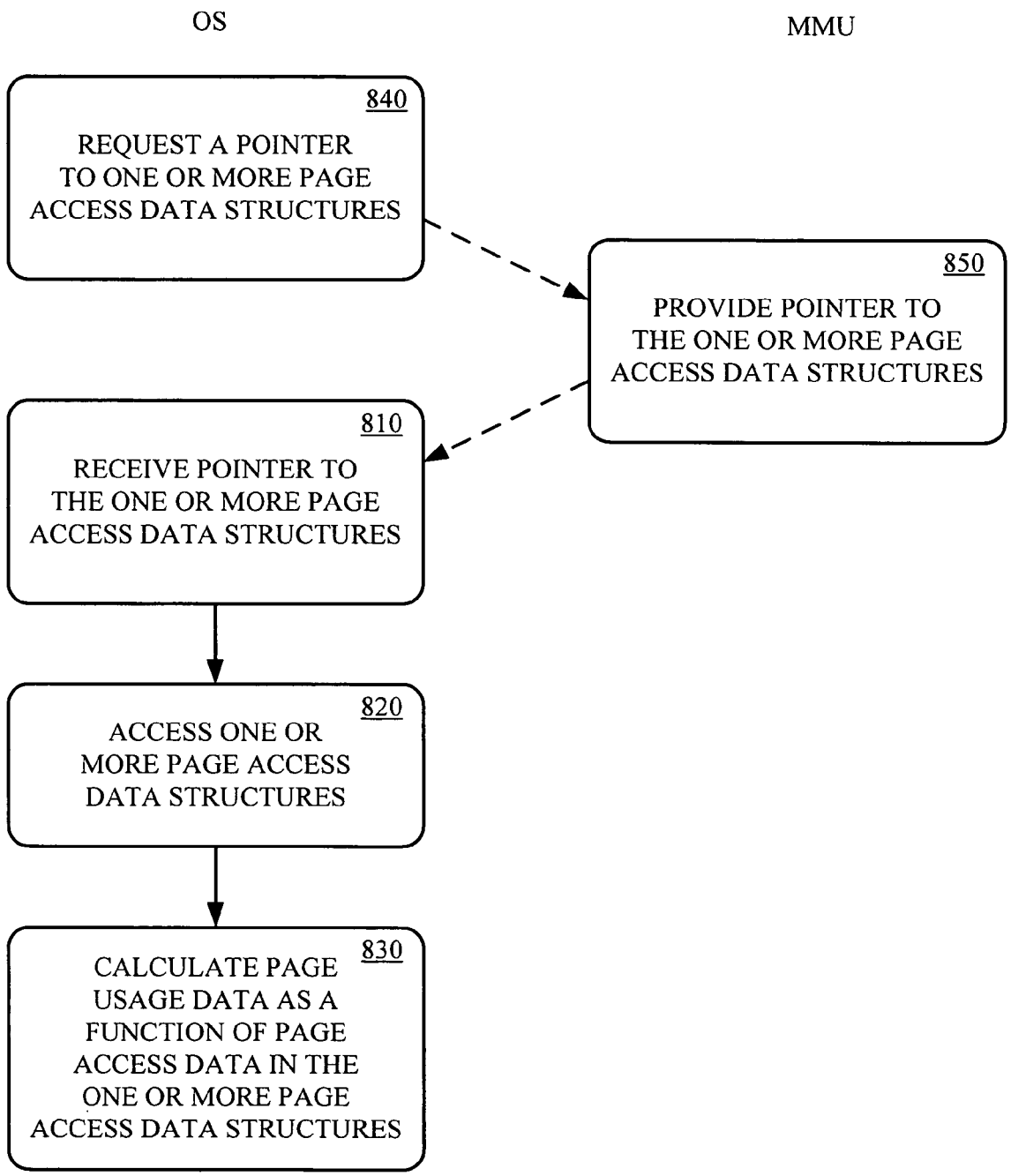
FIG. 8 shows a flow diagram of an exemplary method of utilizing page access data stored in one or more page access data structures, in accordance with one embodiment of the present invention.

One exemplary method of utilizing page access data stored in one or more page access data structures is illustrated in FIG. 8. The method includes receiving a pointer to the one or more page access data structures at 810. At 820, page access data in the one or more page access data structures is accessed. At 830, page usage data, indicating how often one or more pages were accessed during one or more periods, may be calculated as a function of the respective page access bits in the one or more page access data structures. In one implementation, the respective page usage bits from the previous page access data structure may be added to a page usage count to determine the current page usage parameter for one or more periods.

The method may further include requesting a pointer to the one or more data structures containing previous accessed data bits, at 840. At 850, the MMU may provide a pointer to the one or more data structures. The pointer may be passed by the MMU to the OS. Alternatively the OS could also be provide the pointer. The OS may utilize the pointer to access the one or more page access data structures for calculating the page usage data.

Accordingly, page access parameters may advantageously be densely packed in one or more page access data structures. The page access data structure may advantageously be managed separately from other data structures, such as the address translation data structure (e.g., TLB 400). For example, the MMU may advantageously store page access data in the page access data structures. In addition, the MMU may cache the access bit data as it is stored densely. The OS can then separately access the data to manage page caching.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computing device comprising:
   a processor;
   a computing device-readable media, communicatively coupled to the processor, including a page table data structure and a plurality of page access data structures that are separate from the page table data structure, wherein the page table data structure includes one or more translation attributes and the page access data structures include structure including one or more page usage attributes; and
   a memory management unit, communicatively coupled to the processor and the computing device-readable media, to store page access parameter associated with a first period in a first page access data structure and the page access parameter associated with a second period in a second page access data structure.

2. The computing device of claim 1, wherein the memory management unit further translates a given virtual address to a particular physical address using the page table data structure.

3. The computing device of claim 2, wherein the memory management unit further accesses attributes in the page table data structure associated with the translation of the given virtual address to the particular physical address.

4. The computing device of claim 3, wherein the memory management unit further stores page access parameter in a current one of the first and second page access data structures associated with the translation of the given virtual address to the particular physical address.

5. The computing device of claim 1, wherein the page table data structure comprises a translation lookaside buffer (TLB).

6. The computing device of claim 1, wherein the page access data structure stores one or more page access parameters selected from a group consisting of an accessed bit and a referenced bit.

7. The computing device of claim 1, further comprising an operating system stored in the computing device-readable media and when executed by the processor the operating system accesses the page access parameter in the separate page access data structure.

8. The computing device of claim 1, wherein the processor is a central processing unit (CPU) or a graphics processing unit (GPU).

9. The computing device of claim 1, wherein the page access data is cached in the memory management unit.

10. A method of page access parameters caching comprising:
    translating a given virtual address to a particular physical address using a page translation data structure including one or more translation attributes; and
    storing a page access parameter related to the particular physical address in one or a plurality of page access data structures that are separate from the page translation data structure, wherein storing the page access parameter includes;
    checking a state of a period;
    selecting a new one of the plurality of page access data structures as a current page access data structure if the period has ended; and
    storing page access data in the current page access data structure.

11. The method according to claim 10, further comprising:
    receiving the given virtual address; and
    accessing data at the particular physical address.

12. The method according to claim 10, wherein storing the page access parameter related to the particular physical address in the page access data structure further comprises:
    checking a page access indicator;
    storing the page access parameter in the current page access data structure if the page access indicator is in a first state; and
    not storing the page access parameter in the current page access data if the page access indicator is in a second state.

13. The method according to claim 10, wherein translating the given virtual address to a particular physical address comprises accessing a page table data structure.

14. The method according to claim 13, wherein the page table data structure includes one or more page table entries, each page table entry comprising:
    a page frame address; and
    one or more page parameters selected from a group consisting of a dirty bit, a page check disable bit, page write transparent bit, a user accessible bit, a writeable bit, a present bit, a hash function identification bit, a valid bit, an address compare bit, a changed bit, storage control bits, a no execute bit, and page protection bits.

15. The method according to claim 10, wherein the page access data structure stores one or more page access parameters selected from a group consisting of an accessed bit and a referenced bit.

16. A method of page access parameters caching comprising:
    accessing one of a plurality of page access data structures, wherein the page access data structures store one or more page access parameters selected from a group consisting of an accessed bit and a referenced bit, and are separate from an address translation data structure that stores one or more translation attributes, and each page access data structure is associated with a different period; and
    managing computing-device readable media as a function of page access data in the plurality of page access data structures.

17. The method according to claim 16, further comprising:
    requesting a pointer to the one of the plurality of page access data structures; and
    receiving the pointer to the one of the plurality of page access data structures.

18. The method according to claim 17, wherein the pointer to the one of the plurality of page access data structures is requested and received by an operating system and the pointer to the one of the plurality of data page access structures is provided by a memory management unit.

19. The method according to claim 16, wherein managing computing-device readable media further comprises calculating page usage data as a function of page access data in the one of the plurality of page access data structures.

20. The method according to claim 16, further comprising:
receiving a given virtual address;
translating the given virtual address to a particular physical address;
accessing data at the particular physical address; and
storing page access data associated with the particular physical address in page access data structure for a given period.

* * * * *